United States Patent [19]
Lynn et al.

[11] Patent Number: 6,075,101
[45] Date of Patent: Jun. 13, 2000

[54] CONTROL OF SOLUTION CATALYST DROPLET SIZE WITH A PERPENDICULAR SPRAY NOZZLE

[75] Inventors: Timothy Roger Lynn, Hackettstown, N.J.; Clark Curtis Williams, Charleston, W. Va.

[73] Assignee: Union Carbide Chemicals & Plastics Technology Corporation, Danbury, Conn.

[21] Appl. No.: 08/802,230

[22] Filed: Feb. 19, 1997

[51] Int. Cl.[7] .................................. C08F 2/04; C08F 2/02
[52] U.S. Cl. .................................. 526/86; 526/88; 526/68
[58] Field of Search .................................. 526/86, 88, 68

[56] References Cited

U.S. PATENT DOCUMENTS

| | | | |
|---|---|---|---|
| 4,163,040 | 7/1979 | Van den Bossche | 422/131 |
| 4,222,986 | 9/1980 | Smith et al. | 422/131 |
| 4,640,463 | 2/1987 | Krambeck et al. | 239/424 |
| 5,174,889 | 12/1992 | Nielsen | 208/113 |
| 5,213,768 | 5/1993 | Maurel et al. | 422/131 |
| 5,269,980 | 12/1993 | Levendis et al. | 264/9 |
| 5,317,036 | 5/1994 | Brady, III et al. | 523/223 |
| 5,541,270 | 7/1996 | Chinh et al. | 526/68 |
| 5,693,727 | 12/1997 | Goode et al. | 526/86 |

FOREIGN PATENT DOCUMENTS

| | | |
|---|---|---|
| 0 764 665 A2 | 3/1997 | European Pat. Off. |
| 2 357 848 | 7/1974 | Germany . |
| 222 504 A1 | 5/1985 | Germany . |
| 61-207402 | 9/1986 | Japan . |
| WO 94/28032 | 12/1994 | WIPO . |
| 9620780 | 7/1996 | WIPO . |
| 9718888 | 5/1997 | WIPO . |
| WO 97/46599 | 12/1997 | WIPO . |

OTHER PUBLICATIONS

Lund, M.T., P.E. Sojka, A.H. Lefebvre & P.G. Gosselin, "Effervescent Atomization at Low Mass Rates. Part I: The Influence of Surface Tension", *Atomization and Sprays*, Begell House, Inc., 1993, vol. 3, pp. 77–89.

Santangelo, Philip J. & Paul E. Sojka, "A Holographic Investigation of the Near–Nozzle Structure of an Effervescent Atomizer–Produced Spray", *Atomization and Sprays*, Begell House, Inc., 1993, vol. 5, pp. 137–155.

Sales Brochure—Heat Systems–Ultrasonics, Inc., 1938 New Highway, Farmindale, NY 11735, 1986.

Chen, S.K. and A.H. Lefebvre, "influence of Ambient Air Pressure on Effervescent Atomization", *Journal of Propulsion and Power*, vol. 9, No. 1, Jan.–Feb. 1993, pp. 10–15.

Whitlow, J.D. and A.H. Lefebvre, "Effervescent Atomizer Operation and Spray Characteristics", *Atomization and Sprays*, Begell House, Inc. 1993, vol. 3, pp. 137–155.

Soviet Patents Abstracts, week 9536, London: Derwent Publications Ltd., Class A17, AN 95–273769; & RU 1630066 C (Kuib Oil Processing Res Inst) Dec. 13, 1988.

*Primary Examiner*—David W. Wu
*Assistant Examiner*—Caixia Lu-Rutt

[57] ABSTRACT

The use of perpendicular spray nozzles to deliver liquid catalyst to a gas-phase polymerization reactor is taught. Moreover, a method of reducing the amount of gas needed to deliver catalyst is also taught.

19 Claims, 4 Drawing Sheets

The perpendicular spray nozzle

A perpendicular effervescent nozzle.

Figure 1. The perpendicular spray nozzle

Figure 2. A perpendicular effervescent nozzle.

Figure 3. Effect of nitrogen atomization gas flowrate on solution droplet size.

Figure 4. Effect of liquid catalyst diluent addition on particle size.

CONTROL OF SOLUTION CATALYST DROPLET SIZE WITH A PERPENDICULAR SPRAY NOZZLE

FIELD OF THE INVENTION

A method of controlling the size of drops of liquid catalyst entering a gas phase polymerization reactor is taught herein to prevent the formation of large flaky particles which might result from the use of liquid catalysts. Said control is affected by using a perpendicular spray nozzle which produces fine catalyst droplet dispersion, resulting in small spherical primary particles and small particle agglomerates.

BACKGROUND OF THE INVENTION

U.S. Pat. No. 5,317,036 teaches the gas-phase polymerization of olefins with catalysts in liquid form. In such systems resin particle size can be controlled by spraying the liquid catalyst into a zone which is substantially free of resin as disclosed in pending U.S. patent application Ser. No. 08/659,764, filed on Jun. 6, 1996, now U.S. Pat. No. 5,693,727, which is incorporated herein by reference. This process allows a brief period of time for the spray droplets to undergo evaporation and polymerization before contacting the polymer particles already in the reactor, thus reducing the tendency for the droplets to adhere to the already formed particles. The "particle-lean" zone preferably is created by feeding a jet of heated monomer or cycle gas into the side of the reactor.

However, such feed systems often yield particle agglomerates which restrict reactor operability. These particles exhibit a flaky or hollow sphere morphology and result in polymer bulk densities below 160 kg/m$^3$. These particles have a high ratio of cross section to mass and are readily entrained out the top of the fluidized bed, and thereby accumulate in the cycle gas cooler, the compressor suction screen, and the distributor plate. These particles also restrict the flow of resin out of the reactor and in the downstream conveying lines. Avoidance of these types of particles is essential for commercial operation of catalysts in a liquid form.

SUMMARY OF THE INVENTION

It has been found that the use of a perpendicular spray nozzle to deliver a catalyst in liquid form eliminates the formation of large droplets of catalyst. This reduction in the formation of large catalyst drops allows for the control of catalyst particle size and thereby, polymer particle size, avoiding the formation of large flaky particles. This nozzle also allows for control of the ultimate resin particle size by varying the flowrates of the atomization gas and/or the catalyst diluent.

DETAILED DESCRIPTION OF THE INVENTION

It is suspected that the large hollow clusters of polymer which may be produced when using a catalyst in a liquid form in a gas phase polymerization reactor result from large droplets of the catalyst, which are either formed in the injection tube or during coalescence in the liquid spray. Either in flight, or upon contact with resin in the reactor, these large droplets contact a large number of small droplets or particles which adhere to the droplet surface. The solvent, if any, in the catalyst droplet evaporates, depositing the catalyst on the inside surface of the spherical cluster. This deposited catalyst aids polymerization at this site and thereby cements the small particles onto the surface of the expanding spherical cluster, which can eventually break open producing a flaky structure. Thus, the prevention of the formation of these large catalyst droplets is believed to provide a solution to the excessive resin agglomeration and flaking problem.

With the present invention it has been found that a perpendicular spray nozzle produces a fine droplet dispersion, resulting in small spherical primary particles and in clusters of small particles. Moreover, the perpendicular spray nozzles improve the dispersion of the droplets into the monomer and cycle gas jets around the nozzle. It is helpful to locate solution spray nozzles in a jet of either recycle gas or monomer, or a combination of both as disclosed in copending application Ser. No. 08/659,764 filed on Jun. 6, 1996, now U.S. Pat. No. 5,693,729. These gas streams allow the droplets to dry and polymerize somewhat before contacting the resin in the reactor, thus reducing agglomeration. However, when the catalyst spray is delivered colinearly within the gas jets, the high velocities used for these gas jets narrows the spray angle. This reduces the area over which the droplets are sprayed and this can increase the likelihood that the droplets contact and adhere to one another, leading eventually to large particles of poor morphology. Perpendicular spray nozzles reduce this tendency by spraying the catalyst solution over a wider area and into a higher volume of cycle gas or monomer.

Figure 1:
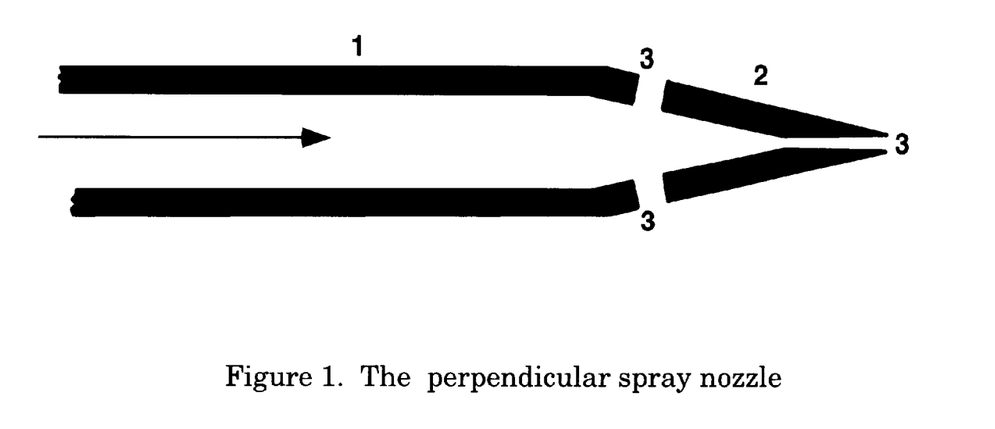
FIG. 1 is an exemplary three-hole perpendicular spray nozzle.

For perpendicular spraying, the liquid may be atomized with an inert carrier gas, as is done with the gas-assisted perpendicular spray nozzle (As shown in FIG. 1). Alternately, a perpendicular pressure nozzle could be used to deliver a perpendicular spray of high-pressure catalyst liquid in the absence of an atomizing gas. Additionally, the perpendicular feeding geometry can be used with effervescent gas-liquid contact in the spraying nozzle or with an ultrasonic nozzle. The invention described herein could also be applied to other known atomization devices, such as electrostatic, sonic-whistle, or rotary, etc. nozzles.

In this application, the term perpendicular spray nozzle refers to a tube for delivering a liquid wherein there is an inlet end for the input of the liquid, and optionally, a gas. The other end of the tube (i.e., "distal end") wherein there is at least one exit hole (orifice) which is at least 10–20°, preferably more than 45°, and most preferably 60 to 90°, off from the direction of flow of the liquid within the nozzle (i.e., from the central axis of the tube), where the orifice is located towards the distal end of the nozzle. Said nozzles may have any number of orifices and may include a gas stream within the liquid stream. There is no need for a separate mixing chamber for the gas and liquid within the nozzle.

An added important benefit of the perpendicular spray nozzles is that they require less inert gas to atomize a given amount of catalyst solution than does an injection tube. The desired droplet size may be achieved herein by gas to liquid mass flow ratios of between about 3:1 and 0.5:1 and more preferably between about 2:1 and 1:1. The amount of inert gas required to atomize 9.1 kg/hr of liquid with the perpendicular spray nozzle, the perpendicular effervescent nozzle, and a 0.30-cm ID injection tube are shown in Table 1. For these examples liquid with a viscosity of 0.002 g/cm s was sprayed at a pressure of 1962 kPa.

TABLE 1

| Nozzle | Inert gas requirement Direction of Spray | Average Droplet Size (mm) |
| --- | --- | --- |
| 0.30 cm ID injection tube | 45.4 kg/hr Colinear | 0.10 |
| Perpendicular spray nozzle | 13.6 kg/hr Perpendicular | 0.045 |
| Perpendicular effervescent | 6.8 kg/hr Perpendicular | 0.025 |

The table shows that with the perpendicular spray nozzle, a fine droplet size of 0.045 mm can be achieved at a gas to liquid mass flow ratio of about 1.5:1.

Catalyst Droplet Size Control

In general, for a given two-fluid or gas-assisted atomization nozzle and a given reactor pressure, the droplet size is a function of the atomization gas flowrate, the total liquid flowrate, and the liquid properties of viscosity, density and surface tension. The flowrate of atomization gas has the strongest influence on the droplet size, for the exemplary nozzle described below. The droplet size distributions from a perpendicular spray nozzle were measured with an imaging system on a spray of 9.1 kg/hr of catalyst solvent in an off-line reactor at a pressure of 1962 kPa. The average droplet size was found to decrease rapidly with increasing nitrogen flow as shown in FIG. 3.

Generally, for gas-assisted atomization, an increase in the total liquid feedrate at constant gas feedrate will increase the droplet size. (See, e.g., Lefebvre, A. H., *Atomization and Sprays,* Taylor and Francis). However, for the perpendicular spray nozzle described herein the average droplet size is essentially invariant over the practical range of delivery of 5 to 10 kg/hr of liquid at a 9 kg/hr nitrogen atomization rate. Furthermore, over the practical range of use for the perpendicular spray nozzle, the changes in the liquid properties (density, viscosity, and surface tension) resulting from dilution of the catalyst/cocatalyst solution with additional solvent have only a minor influence on the droplet size when compared with the effect of the atomization gas flowrate.

Actual catalyst drop particle size may also be controlled through the use of a dilation control device on the orifice. Such a device would allow expanding or contracting the orifice size to regulate drop size. Said control may be effected in-line and/or automatically.

Polymer Particle Size Control

The ultimate resin particle size is determined by the initial catalyst droplet size, the amount of catalyst in a droplet, and by the degree of agglomeration between the new droplets and resin particles in the reactor. As mentioned above, the droplet size is governed primarily by the flow rate or velocity of the atomizing gas. The amount of catalyst in a droplet is governed by the amount of diluent added to the liquid catalyst stream and by the droplet size. The degree of agglomeration between new droplets and particles can be influence by the droplet size, the amount of catalyst in the particle, the catalyst activity and kinetic behavior, and the evaporation rate of the droplet solvent(s).

In commercial practice, the liquid stream consists of the catalyst, the cocatalyst, optional activators, and optionally, a diluent. The total liquid rate is adjusted by changing the amount of diluent added to the steady flow of catalyst and cocatalyst necessary to maintain a constant polymerization rate. For the perpendicular spray nozzle, an increase in total liquid flow results in the formation of more droplets of similar size and decreased catalyst content.

By adjusting the droplet size and the amount of catalyst in a droplet, the final resin particle size can be controlled. An increase in the atomization rate decreases the particle size and decreases the resin average particle size (APS). Depending on the conditions, the total liquid rate can be changed to either increase or decrease the final resin property size.

For cases of highly active catalyst, the diluent flow can reduce the amount of catalyst in each droplet, preventing overheating and agglomeration. The particle size can be controlled by adjusting the amount of diluent fed with the catalyst, illustrated in FIG. 4. If too much diluent is added, the reactor dew point is increased and the catalyst activity per volume of droplet is low. These factors slow the evaporation rate from the droplets so that the overall particle size may be too large (to the right of point D). Under cases of high activity, low dew point, and concentrated catalyst solution (to the left of A), the particles can overheat and fuse together. Depending on the operating conditions, a change in the amount of diluent fed with the catalyst can shift the resin average particle size (APS) into a desirable range. The opposite can also occur, that is, changes in catalyst dilution can improve a very small APS to an acceptable range (movement out of the small APS and into the desired AB or CD ranges.) The amount of diluent fed with the catalyst and the amount of diluent vapor in the process cycle gas can be varied independently. Often, an additional stream of the solvent used to dilute the catalyst and cocatalyst can be fed directly to the process as an induced condensing agent. In this way the relative rate of solvent evaporation can be controlled by adjusting the amount of solvent vapor in the cycle gas. When the level of induced condensing agent is increased in the cycle gas, the evaporation rate of the droplets can decrease, which can lead to increase particle size under some conditions. In this case, the amount of solvent in the droplets can be decreased by feeding less solvent with the catalyst, and the droplet size can be decreased by feeding more atomization gas, in this way the droplets can form new stable particles more readily under the conditions of increased dew point or condensation in the cycle gas.

The perpendicular spray nozzle can produce catalyst droplets of a desired average size (0.005 to 0.150 mm) within a narrow size distribution. The droplet size can be adjusted without disturbing the ongoing polymerization reaction by regulating liquid and gas flow rates. A narrow distribution of droplet size, from about 0.005 to about 0.150 mm, preferably about 0.010 to 0.0750 mm, can prevent the formation of large agglomerates resulting from large droplets and the formation of fines resulting from small droplets. Under many conditions, however, a wide droplet size distribution is acceptable since the smaller droplets can agglomerate to some degree with the resin in the reactor and large droplets can from larger particles of up to 0.5 cm which can be readily fluidized as long as the particle fraction is low enough, preferably less than about 10% and more preferably less than 2% by weight of the total resin in the bed.

The use of this drop size/flow rate model may be operationally linked (via computer, live operator or other means) to specific reactor conditions and controls, which would allow control of the catalyst drop size in relation to polymer particle size in the reactor. The polymer bulk density is known to decrease in the presence of the undesired larger particles. With bulk density fluctuations there are commensurate changes in the bed level and the breadth of the fluidization bands depicting the oscillations of the bed. If the polymer particles are too small, they tend to accumulate in the top of the reactor and can be discerned by detecting changes of the fluidized bulk density, bed level and high bed level. Based on such readings, appropriate changes can be made to the liquid and gas flows (or even orifice size) in the nozzle to adjust the particles to within a desired range to maintain the resin size during the course of polymerization. Such control may be accomplished separately from catalyst flow rate if a liquid diluent is used for the catalyst, i.e., the diluent level may be controlled separately from the catalyst feed rate. As can be understood by one of skill in the art, this may be done using automated control technology.

Additional control of average particle size may be achieved by using multiple perpendicular spray nozzles or a combination of perpendicular spray and other atomization devices, each creating a unique droplet size. The relative catalyst feedrates then can be changed to control the overall average particle size. Furthermore, multiple nozzles could be used to spray different catalysts, of differing solvent compatibilities and particle formation tendencies, to produce polymers of broad or bimodal molecular weight and comonomer distributions in a single reactor.

Catalyst. Any type of polymerization catalyst may be used in the present process, provided it is stable and sprayable or atomizable when in liquid form. A single liquid catalyst may be used, or a liquid mixture of catalysts may be employed if desired. A dispersion of slurry of supported catalysts may also be used. These catalysts are used with cocatalysts and promoters well known in the art. Examples of suitable catalysts include:

A. Ziegler-Natta catalysts, including titanium based catalysts such as those described in U.S. Pat. Nos. 4,376,062 and 4,379,758. Ziegler-Natta catalysts are typically are magnesium/titanium/electron donor complexes used in conjunction with an organoaluminum cocatalyst.
  B. Chromium based catalysts such as those described in U.S. Pat. Nos. 3,709,853; 3,709,954; and 4,077,904.
  C. Vanadium based catalysts such as vanadium oxychloride and vanadium acetylacetonate, such as described in U.S. Pat. No. 5,317,036.
  D. Metallocene catalysts.
  E. Cationic forms of metal halides, such as aluminum trihalides.
  F. Cobalt catalysts and mixtures thereof such as those described in U.S. Pat. Nos. 4,472,559 and 4,182,814.
  G. Nickel catalysts and mixtures thereof such as those described in U.S. Pat. Nos. 4,155,880 and 4,102,817.
  H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. Neodymium compounds, particularly neodymium neodecanoate, octanoate, and versatate, are the most preferred rare earth metal catalysts. Rare earth catalysts are used to produce polymers polymerized using butadiene or isoprene.

Preferred among these different catalyst systems are catalyst compositions comprising a metallocene catalyst in liquid form and an activating cocatalyst. The practice of this invention is not limited to any particular class or kind of metallocene catalyst. Accordingly, the catalyst composition may comprise any unsupported metallocene catalyst useful in slurry, solution, bulk, or gas phase olefin polymerization. One or more than one metallocene catalyst may be employed. For example, as described in U.S. Pat. No. 4,530,914, at least two metallocene catalysts may be used in a single catalyst composition to achieve a broadened molecular weight distribution polymer product.

Metallocene catalysts are organometallic coordination complexes of one or more II-bonded moieties in association with a metal atom from Groups IIIB to VIII or the rare earth metals of the Periodic Table.

Bridged and unbridged mono-, bis-, and tris-cycloalkadienyl/metal compounds are the most common metallocene catalysts, and generally are of the formula:

$$(L)_y R^1_z (L')M X_{(x-y-1)} \tag{II}$$

wherein M is a metal from groups IIIB to VIII of the Periodic Table; L and L' are the same or different and are π-bonded ligands coordinated to M, preferably cycloalkadienyl groups such as cyclopentadienyl, indenyl, or fluorenyl groups optionally substituted with one or more hydrocarbyl groups containing 1 to 20 carbon atoms; $R^1$ is a $C_1$–$C_4$ substituted or unsubstituted alkylene radical, a dialkyl or diaryl germanium or silicon, or an alkyl or aryl phosphine or amine radical bridging L and L'; each X is independently hydrogen, an aryl, alkyl, alkenyl, alkylaryl, or arylalkyl radical having 1–20 carbon atoms, a hydrocarboxy radical having 1–20 carbon atoms, a halogen, $R^2 CO_2$—, or $R^2_2 NCO_2$—, wherein each $R^2$ is a hydrocarbyl group containing 1 to about 20 carbon atoms; n and m are each 0, 1, 2, 3, or 4; y is 0, 1, or 2; x is 1, 2, 3, or 4 depending upon the valence state of M; z is 0 or 1 and is 0 when y is 0; and x−y≧1.

Illustrative but non-limiting examples of metallocene catalysts represented by formula II are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=$CH_2$ and derivatives of this reagent; substituted bis(cyclopentadienyl)titanium (IV) compounds such as: bis(indenyl)titanium diphenyl or dichloride, bis(methylcyclopentadienyl)titanium diphenyl or dihalide; dialkyl, trialkyl, tetraalkyl and pentaalkyl cyclopentadienyl titanium compounds such as bis(1,2- dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like; as well as bridged metallocene compounds such as isopropyl (cyclopentadienyl)(fluorenyl)zirconium dichloride, isopropyl(cyclopentadienyl)(octahydrofluorenyl)zirconium dichloride, diphenylmethylene(cyclopentadienyl)(fluorenyl) zirconium dichloride, diisopropylmethylene (cyclopentadienyl)(fluorenyl)-zirconium dichloride, diisobutylmethylene(cyclopentadienyl)(fluorenyl)zirconium dichloride, ditertbutylmethylene(cyclopentadienyl)- (fluorenyl)zirconium dichloride, cyclohexylidene (cyclopentadienyl)-(fluorenyl)zirconium dichloride, diisopropylmethylene(2,5-dimethylcyclopentadienyl) (fluorenyl)zirconium dichloride, isopropyl (cyclopentadienyl)(fluorenyl)hafnium dichloride, diphenylmethylene(cyclopentadienyl)(fluorenyl)hafnium dichloride, diisopropylmethylene(cyclopentadienyl) (fluorenyl)hafnium dichloride, diisobutylmethylene (cyclopentadienyl)(fluorenyl)hafnium dichloride, ditertbutylmethylene(cyclopentadienyl)(fluorenyl)hafnium dichloride, cyclohexylidene(cyclopentadienyl)(fluorenyl) hafnium dichloride, diisopropylmethylene(2,5-dimethylcyclopentadienyl)(fluorenyl)-hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl) (fluorenyl)titanium dichloride, diisobutylmethylene (cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 dimethylcyclopentadienyl fluorenyl)titanium dichloride, racemic-ethylene bis (1-indenyl) zirconium (IV) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dimethylsilyl bis (4,5,6,7-tetrahydro-1-indenyl) zirconium (IV) dichloride, racemic-1, 1,2,2-tetramethylsilanylene bis (1-indenyl) zirconium (IV) dichloride, racemic-1,1,2,2-tetramethylsilanylene bis (4,5,6, 7-tetrahydro-1-indenyl) zirconium (IV) dichloride, ethylidene (1-indenyl tetramethylcyclopentadienyl) zirconium (IV) dichloride, racemic-dimethylsilyl bis (2-methyl-4-t-butyl-1-cyclopentadienyl) zirconium (IV) dichloride, racemic-ethylene bis (1-indenyl) hafnium (IV) dichloride, racemic-ethylene bis (4,5,6,7-tetrahydro-1-indenyl) hafnium (IV) dichloride, racemic-dimethylsilyl bis (1-indenyl) hafnium (IV) dichloride, racemic-dimethylsilyl bis (4,5,6,7-tetrahydro-1-indenyl) hafnium (IV) dichloride, racemic-1,1,2,2-tetramethylsilanylene bis (1-indenyl) hafnium (IV) dichloride, racemic-1,1,2,2-tetramethylsilanylene bis (4,5,6,7-tetrahydro-1-indenyl) hafnium (IV), dichloride, ethylidene (1-indenyl-2,3,4,5-tetramethyl-1-cyclopentadienyl) hafnium (IV) dichloride, racemic-ethylene bis (1-indenyl) titanium (IV) dichloride, racemic-ethylene bis (4,5,6,7-tetrahydro-1-indenyl) titanium (IV) dichloride, racemic-dimethylsilyl bis (1-indenyl) titanium (IV) dichloride, racemic-dimethylsilyl bis (4,5,6,7-tetrahydro-1-indenyl) titanium (IV) dichloride, racemic-1,1, 2,2-tetramethylsilanylene bis (1-indenyl) titanium (IV) dichloride racemic-1,1,2,2-tetramethylsilanylene bis (4,5,6, 7-tetrahydro-1-indenyl) titanium (IV) dichloride, and ethylidene (1-indenyl-2,3,4,5-tetramethyl-1-cyclopentadienyl) titanium IV) dichloride.

Particularly preferred metallocene catalysts have one of the following formulas (III or IV):

(III)

or (IV)

wherein:

M is a metal from groups IIIB to VIII, preferably Zr or Hf;

L is a substituted or unsubstituted, π-bonded ligand coordinated to M, preferably a substituted cycloalkadienyl ligand;

each Q is independently selected from the group consisting of —O—, —NR$^3$—, —CR$^3_2$— and —S—, preferably oxygen;

Y is either C or S, preferably carbon;

Z is selected from the group consisting of —OR$^3$, —NR$^3_2$, —CR$^3_3$, —SR$^3$, —SiR$^3_3$, —PR$^3_2$, and —H, with the proviso that when Q is —NR$^3$—then Z is selected from the group consisting of —OR$^3$, —NR$^3_2$, —SR$^3$, —SiR$^3_3$, —PR$^3_2$, and —H, preferably Z is selected from the group consisting of —OR$^3$, —CR$^3_3$, and —NR$^3_2$;

n is 1 or 2;

A is a univalent anionic group when n is 2 or A is a divalent anionic group when n is 1, preferably A is a carbamate, carboxylate or other heteroallyl moiety described by Q, Y and Z combination; and each R$^3$ is independently a group containing carbon, silicon, nitrogen, oxygen, and/or phosphorus and one or more R$^3$ groups may be attached to the L substituent, preferably R$^3$ is a hydrocarbon group containing from 1 to 20 carbon atoms, most preferably an alkyl, cycloalkyl or an aryl group;

T is a bridging group selected from the group consisting of alkylene or arylene groups containing from 1 to 10 carbon atoms optionally substituted with carbon or heteroatoms, germanium, silicone and alkyl phosphine; and m is 1 to 7, preferably 2 to 6, most preferably 2 or 3.

The supportive substituent formed by Q, Y and Z is a unicharged polydentate ligand exerting electronic effects due to its high polarizability, similar to the cyclopentadienyl group. In the most preferred embodiments of this invention, the disubstituted carbamates, and the carboxylates are employed.

Examples of metallocene catalysts according to formulas III and IV include indenyl zirconium tris(diethylcarbamate), indenyl zirconium tris(pivalate), indenyl zirconium tris(p-toluate), indenyl zirconium tris(benzoate), (1-methylindenyl) zirconium tris(pivalate), (2-methylindenyl) zirconium tris(diethylcarbamate), (methylcyclopentadienyl) zirconium tris(pivalate), cyclopentadienyl tris(pivalate), and (pentamethylcyclopentadienyl) zirconium tris(benzoate). Preferred examples of these metallocene catalysts are indenyl zirconium tris(diethylcarbamate) and indenyl zirconium tris(pivalate).

Another type of metallocene catalyst that can be used in accordance with the invention is a constrained geometry catalyst of the formula:

(V)

wherein:

M is a metal of Group IIIB to VIII of the Periodic Table of the Elements:

Cp is a cyclopentadienyl or substituted cyclopentadienyl group bound in an $\eta^5$ bonded mode to M;

Z' is a moiety comprising boron, or a member of Group IVB of the Periodic Table of the Elements and optionally sulfur or oxygen, the moiety having up to 20 non-hydrogen atoms, and optionally Cp and Z' together form a fused ring system;

X' is an anionic ligand group or a neutral Lewis base ligand group having up to 30 non-hydrogen atoms;

a is 0, 1, 2, 3 or 4 depending on the valance of M; and

Y' is an anionic or non-anionic ligand group bonded to Z' and M comprising is nitrogen, phosphorus, oxygen or sulfur having up to 20 non-hydrogen atoms, and optionally Y' and Z' together form a fused ring system.

Constrained geometry catalysts are well known to those skilled in the art and are disclosed in, for example, U.S. Pat. Nos. 5,026,798 and 5,055,438 and published European Application No. 0 416 815 A2.

Illustrative but non-limiting examples of substituents Z', Cp, Y', X' and M in formula V are:

| Z' | Cp | Y' | X' | M |
|---|---|---|---|---|
| dimethyl-silyl | cyclopenta-dienyl | t-butylamido | chloride | titanium |
| methyl-phenylsilyl | fluorenyl | phenylamido | methyl | zirconium |
| diphenyl-silyl | indenyl | cyclohexylamido | | hafnium |
| tetramethyl-ethylene | | oxo | | |
| ethylene | tetramethyl-cyclopenta-dienyl | | | |
| diphenyl-methylene | | | | |

The invention is also useful with another class of single site catalyst precursors, di(imine) metal complexes, as described in PCT Application No. WO 96/23010, which is incorporated herein by reference.

The activating cocatalyst is capable of activating the metallocene catalyst. Preferably, the activating cocatalyst is one of the following: (a) branched or cyclic oligomeric poly(hydrocarbyl-aluminum oxide)s which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group; (b) ionic salts of the general formula $[A^+][BR^{}_4-]$, where $A^+$ is a cationic Lewis or Bronsted acid capable of abstracting an alkyl, halogen, or hydrogen from the metallocene catalysts, B is boron, and R is a substituted aromatic hydrocarbon, preferably a perfluorophenyl radical; and (c) boron alkyls of the general formula $BR^{}_3$, where R is as defined above.

Preferably, the activating cocatalyst is an aluminoxane such as methylaluminoxane (MAO) or modified methylaluminoxane (MMAO), or a boron alkyl. Aluminoxanes are preferred and their method of preparation is well known in the art. Aluminoxanes may be in the form of oligomeric linear alkyl aluminoxanes represented by the formula:

or oligomeric cyclic alkyl aluminoxanes of the formula:

wherein s is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of MAO, R* is methyl, whereas in MMAO, R* is a mixture of methyl and C2 to C12 alkyl groups wherein methyl comprises about 20 to 80 percent by weight of the R* group.

The amount of activating cocatalyst and metallocene catalyst usefully employed in preparation of the catalyst composition, whether the catalyst composition is formed in situ as it is being introduced into the reaction zone or formed prior to introduction into the reaction zone, can vary over a wide range. When the cocatalyst is a branched or cyclic oligomeric poly(hydrocarbylaluminum oxide), the mole ratio of aluminum atoms contained in the poly (hydrocarbylaluminum oxide) to metal atoms contained in the metallocene catalyst is generally in the range of from about 2:1 to about 100,000:1, preferably in the range of from about 10:1 to about 10,000:1, and most preferably in the range of from about 50:1 to about 2,000:1. When the cocatalyst is an ionic salt of the formula $[A^+][BR^*_4-]$ or a boron alkyl of the formula $BR^*_3$, the mole ratio of boron atoms contained in the ionic salt or the boron alkyl to metal atoms contained in the metallocene catalyst is generally in the range of from about 0.5:1 to about 10:1, preferably in the range of from about 1:1 to about 5:1.

The liquid catalyst can be composed of one or more of metal compounds in combination with one or more co-catalysts. Alternatively, all or a portion of the co-catalyst can be fed separately from the metal compound(s) to the reactor. Promoters associated with any particularly polymerization are usually added to the reactor separately from the co-catalyst and/or metal compound(s).

If the metal compound and/or the co-catalyst occurs naturally in liquid form, it can be introduced "neat" into the particle lean zone. More likely, the liquid catalyst is introduced into the particle lean zone as a solution (single phase, or "true solution" using a solvent to dissolve the metal compound and/or co-catalyst), an emulsion (partially dissolving the catalyst components in a solvent), suspension, dispersion, or slurry (each having at least two phases). Preferably, the liquid catalyst employed is a solution or an emulsion, most preferably a solution. As used herein, "liquid catalyst" or "liquid form" includes neat, solution, emulsion, colloids, suspension and dispersions of the transition metal or rare earth metal component(s) of the catalyst and/or co-catalyst.

The solvents which can be utilized to form liquid catalysts are inert solvents, preferably non-functional hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, tetrahydrofuran and the like; petroleum fractions such as gasoline, kerosene, light oils, and the like; and mineral oil. Likewise, halogenated hydrocarbons such as methylene chloride, chlorobenzene, ortho-chlorotoluene and the like may also be utilized. By "inert" is meant that the material being referred to is non-deactivating in the polymerization reaction zone under the conditions of gas phase polymerization and is non-deactivating with the catalyst in or out of the reaction zone. By "non-functional", it is meant that the solvents do not contain groups such as strong polar groups which can deactivate the active catalyst metal sites.

The concentration of the catalyst and/or co-catalyst that is in solution that is provided to the lean particle zone may be as high as the saturation point of the particular solvent being used. Preferably, the concentration is in the range of from about 0.01 to about 10,000 millimoles/liter. Of course, if the catalyst and/or co-catalyst is being used in its neat form, i.e., in its liquid state with no solvent, it will be comprised of essentially pure catalyst and/or co-catalyst, respectively. Liquid flowrates of catalyst, cocatalyst, and activators range between 5 and 250 kg/hr for commercial scale gas-phase reactors.

Gas

The optional gases for use in the perpendicular spray nozzle may be any relatively inert to the catalyst so that there is not blockage in the catalyst nozzle. Exemplary gases include $N_2$, Ar, He, $CH_4$, $C_2H_6$, $C_3H_8$, $CO_2$, $H_2$, cycle gas. Reactive gases (e.g., olefins) may be used if the catalyst is activated in the reactor, e.g., the cocatalyst is fed separately. The gas flow rates in the nozzle should be between about 5 and 200 kg/hr., depending upon the reactor size and particle size control as discussed above.

Other Material

The perpendicular spray nozzle also may be used to deliver non-catalytic liquids to the reactor, e.g., solvents, anti-fouling agents, scavengers, monomers, antistatic agents, secondary alkyls, stabilizers or antioxidants. Some specific examples include methanol, veratrole, propylene oxide, glyme, water, ATMER-163 antistat agent (ICI Chemicals), hydrogen, metal alkyls of the general formula $M^3R^5g$, where $M^3$ is a Group IA, IIA or IIIA metal, $R^5$ is an alkyl or aryl, and g is 1, 2, or 3; zinc alkyls, $CHCl_3$, $CFCl_3$, $CH_3CCl_3$, $CF_2ClCCl_3$, ethyltrichloroacetate, aluminum alkyls, most preferably triisobutylaluminum. The gas in such situations may be the cycle gas in a gas phase reactor that is operating in condensing mode or may be another inert gas, as is used with the delivery of the catalyst. The addition of this liquid can be any where to the reaction system, e.g., to the bed, beneath the bed, above the bed or to the cycle line. The use of these additives is well within the skill of those skilled in the art. These additives may be added to the reaction zone separately or independently from the liquid catalyst if they are solids, or as part of the catalyst provided they do not interfere with the desired atomization. To be part of the catalyst solution, the additives should be liquids or capable of being dissolved in the catalyst solution.

Nozzle Design

There are several requirements of the perpendicular spray nozzle for use herein. The nozzle should be able to withstand high pressures (up to 4200 kPa) and temperatures (up to 300° C.), and a harsh chemical environment (e.g., aluminum alkyls, HCl, etc.). The nozzle should be able to deliver the spray at elevated pressures (up to 3500 kPa). The nozzle should be easily and safely introduced and removed from a reactor without interrupting the reactor operation. The nozzle should not be easily plugged by suspended solid contaminants. The nozzle should not allow back-flow of reactive monomer.

The nozzle should not allow fouling from the polymer in the reactor. This may be accomplished through the use of a deflecting gas, i.e., gas that is used to reduce the resin density at or near the nozzle entrance, which allows the catalyst to enter the reactor at a resin-lean zone in the reactor, i.e., an area substantially free from polymer. If this deflecting gas flows past the orifice of the nozzle, it will sweep away any resin, keeping the orifice clear. How such a deflecting gas may be configured is disclosed in U.S. patent application Ser. No. 08/659,764, filed on Jun. 6, 1996, now U.S. Pat. No. 5,693,727 which is incorporated herein by reference.

The nozzle is constructed of any material which is not reactive under the selected polymerization conditions, including, but not limited to, aluminum, aluminum bronze, Hastalloy, Inconel, Incoloy, monel, chrome carbide, boron carbide, cast iron, ceramics, copper, nickel, silicon carbide, tantalum, titanium, zirconium, tungsten carbide, as well as certain polymeric compositions. Particularly preferred is stainless steel.

The distal end of the nozzle may be of any geometric configuration, e.g., bulbous, rounded, parabolic, conical, or semicircular, but to limit turbulence the nozzle preferably is tapered at about 5 to 15 degrees off horizontal (the central axis of the tube). Higher taper angles can be tolerated given that the taper from horizontal is gradual. A tapered tip also minimizes fouling because of the small area available for accumulation of catalyst and polymer.

Commercial wide-angle spray nozzles, such as those marketed by Sono-Tek Co or Delavan usually require large tips to increase the spray angle. Such wide tips can provide a large area for unacceptable accumulation of catalyst and polymer in a gas-phase fluidized-bed reactor. With the methods described in this invention, a wide angle spray could be achieved from a nozzle with a fine tapered tip.

As stated above, the nozzle may have many different configurations. This may include the orifice being a rotary design or the nozzle having rifling to impart a spin to the liquid. An ultrasonic nozzle has a piezo-electric crystal which may be automatically controlled to affect changes to particle size.

Figure 2:
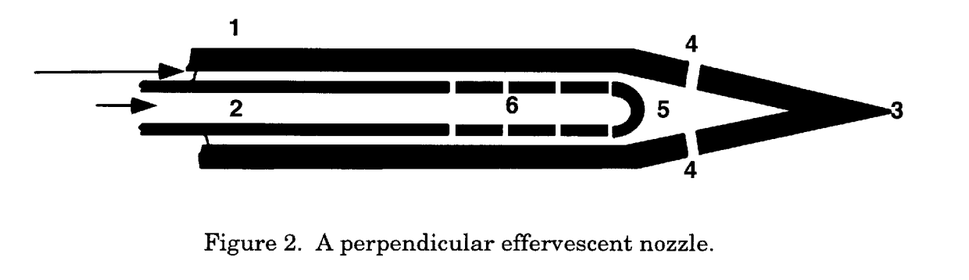
FIG. 2 is an exemplary two-hole perpendicular effervescent nozzle.
Figure 3:
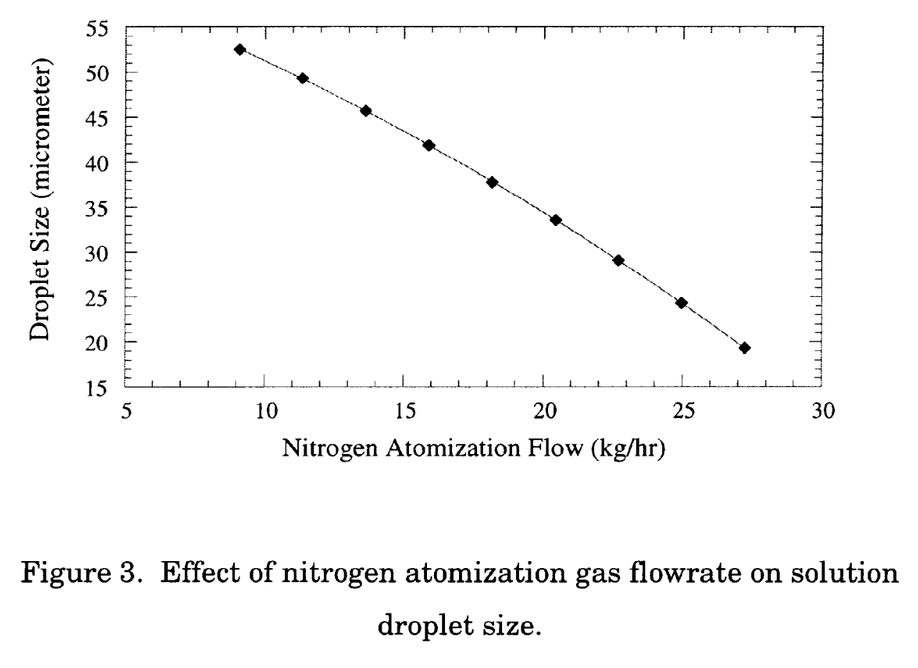
FIG. 3 is a graph plotting droplet size ($\mu$m) vs. N$_2$ flow rate to show the effect of N$_2$ flow on droplet size.
Figure 4:
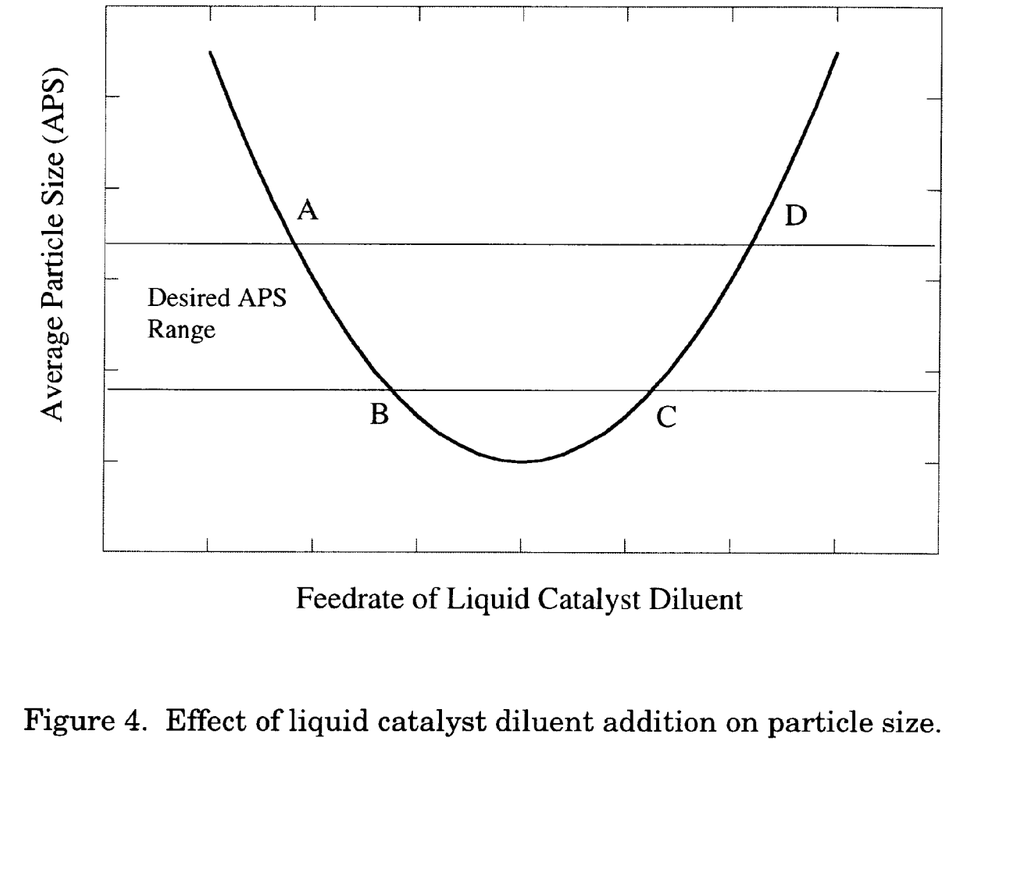
FIG. 4 indicates the effect of liquid catalyst diluent addition on particle size.

Another possible configuration of the perpendicular spray nozzle is the perpendicular effervescent nozzle, wherein there is an inner tube within a concentric outer tube wherein the liquid is carried through the annular space between the tubes and a gas is carried through the inner tube. Alternately, the liquid may be fed through the inner tube and the gas through the annulus. Liquid and gas are fed separately through the inlets of the nozzle. There are small holes in the inner tube near the spray tip which allow the gas to contact the liquid prior to the liquid reaching the orifice. The spray tip of the outer tube is tapered as above. Again there is at least one orifice towards the distal end of the outer tube, where the orifice is at least 10° to 20°, preferably 20° to 60° and most preferably 60° to 90° off from the central axis of the tube. An exemplary perpendicular spray nozzle is shown in FIG. 1. An exemplary perpendicular effervescent nozzle is shown in FIG. 2.

Pneumatic perpendicular nozzle

In a standard pneumatic perpendicular spray nozzle, as depicted in FIG. 1, the catalyst and optional diluent are carried down the central axis of the tube 1 with an optional atomization gas. Some small droplets are suspended in this gas flow and exit the nozzle at the tapered end 2 through the orifices 3, at least one of which is at least 10° to 20°, preferably 20° to 60°, and most preferably 60 to 90°, off from the central axis of the tube 1. Most of the liquid passes down the tube 1 as a film on the wall or in a liquid slug. These slugs or films are atomized to a fine spray as the carrier gas is forced through the orifices 3.

The nozzle can be designed with one or more orifices. The orifices should be drilled on the tapered section or on the cylindrical section, and optionally, additional orifices may be drilled at the tip. Hole diameter can be designed for a given range of catalyst liquid. Best results have been obtained with the gas to liquid mass flow ratio between about 0.5:1 to about 3:1, preferably between about 0.75:1 to about 1.5:1. The diameters are designed so that the gas superficial exit velocity is between about 4 and about 75 m/s, preferably between 9 and 55 m/s, and most preferably between 14 and 28 m/s. The actual individual orifice size is not critical, rather total surface area of the orifices is the determining factor. A hole at the end of the nozzle tip is optional. Its purpose is to allow a stream of gas to flow out at the tip, thus preventing a stagnant zone at the tip.

Many variations on the nozzle geometry could be used. For example, slots perpendicular to the axis of the tube of about 1 mm×3 mm may be used instead of holes for the orifices. Slots can be cut along the axis of the cylindrical section near the tip or on the tapered section. Slots could be cut perpendicularly to the tube at those locations. Or, a slot could be made which runs across the end of the tip.

It is noted, though not shown, there are means for delivering the liquid and gas to the tube 1 which are connected to the inlet end of the tube. Said means are any as are standard in the art for this purpose.

The tube diameter could range from about ⅛-inch (3.175 mm) to ½-inch (12.7 mm). The orifice can be between about 0.25 mm to 6 mm, preferably between about 1.5 mm and 3 mm.

In a particular embodiment as depicted in FIG. 1, the perpendicular spray nozzle is machined from ¼"(6.35 mm) OD stainless steel rodstock. The tip is tapered to a 1.6 mm tip over the last 1.2 cm of the nozzle. A 1.27 mm hole is drilled at the tip of the nozzle, and two 1.98 mm holes are drilled at the sides of the tapered section, about 6.4 cm back from the tip. These larger holes are located opposite each other. The tips are welded to a 3 m section of standard ¼-inch (6.4 mm) stainless steel tubing which is used to support the tip and deliver the catalyst solution and carrier gas. The tip is located within a jet of tip-cleaning gas of 450 to 1400 kg/hr of heated monomer, which is in turn is located within a jet of cycle gas of 4,000 to 30,000 kg/hr Perpendicular Effervescent Nozzles A preferred embodiment of a perpendicular effervescent nozzle is depicted in FIG. 2. There is an outer tube 1 and an inner concentric tube 2. The tip 3 of the outer tube is tapered to a point, with orifices 4, being present along the tapered tip 3. The orifices 4 are essentially perpendicular to the axis of the nozzle. The inner tube is sealed shut at one end 5, but has holes 6 along its length near the tip. It is noted, though, that the end of the smaller inside tube 5 may be completely open in certain instances. It is intended that the gas of the nozzle be fed into the inner tube 2 and the liquid catalyst in the outer tube 1, both being fed in the same direction, flowing towards the orifices 4. The gas forms bubbles in the liquid as it exits through the holes 6 and forces the liquid to the outer walls of the tube 1. Thus, as the liquid exits through the orifice, the gas is assisting in spreading out the liquid.

For the perpendicular effervescent nozzle with two holes (FIG. 2), the diameters (0.71 mm) were chosen such that the area of those holes matches the area of the single hole of the colinear effervescent nozzle (0.04 inches 1.02 mm).

Polymers Illustrative of the polymers which can be produced in accordance with the invention are the following: ethylene homopolymers and ethylene copolymers employing one or more $C_3$–$C_{12}$ alpha olefins; propylene homopolymers and propylene copolymers employing one or more $C_4$–$C_{12}$ alpha olefins; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like. Preferably, polyethylene of bulk density between 240 to 416 kg/m$^3$ is made.

Polymerization The present invention is not limited to any specific type of gas phase polymerization reaction and can be carried out in a stirred or fluidized bed reactor. The invention can be carried out in a single reactor or multiple reactors (two or more reactors in series). In addition to well known conventional gas phase polymerizations processes, "condensed mode", including the so-called "induced condensed mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream.

Condensed mode polymerizations are disclosed in U.S. Pat. Nos. 4,543,399; 4,588,790; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it desirable that the liquid entering the fluidized bed be dispersed and vaporized quickly.

Liquid monomer polymerization mode is disclosed, in U.S. Pat. No. 5,453,471, U.S. Ser. No. 510,375, PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, liquid monomer process are conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter.

In a preferred embodiment of the present invention, the liquid catalyst in a carrier gas (e.g., nitrogen, argon, alkane, or mixtures thereof) is surrounded by at least one gas which serves to move or deflect resin particles of the bed out of the path of the liquid catalyst as it enters the fluidization zone and away from the area of catalyst entry, thereby providing a particle lean zone. The first or particle-deflecting gas can be selected from the group consisting of recycle gas, monomer gas, chain transfer gas (e.g., hydrogen), inert gas or mixtures thereof. Preferably the particle-deflecting gas is all or a portion of recycle gas and the tip-cleaning gas is all or a portion of a monomer (e.g., ethylene or propylene) employed in the process.

EXAMPLES

Polymerizations in a Commercial-scale Reactor with Solution Metallocene Catalyst The examples below demonstrate the use of the perpendicular spray nozzle during the production of ethylene-hexene copolymer on a commercial scale reactor. Comparative examples show that hollow, flaky particles, or excessively large particles can be formed when standard injection tubes are used to spray catalyst into the reactor. By the appropriate adjustment of the nitrogen atomization gas and the isopentane catalyst diluent, a target APS can be achieved for each catalyst even though they differ in activity and kinetic behavior.

The catalyst used for Examples 1 through 5 was a Zr-based metallocene as a 2 wt % solution in n-hexane. The solution was used as made for Examples 1 to 3, but was diluted with 1-hexene for Examples 4 and 5 to 1.33 wt-% catalyst with 32.9% 1-hexene and 65.8% hexane.

A different proprietary Zr-based metallocene catalyst was used for Examples 6 and 7. This catalyst was used as a 2 wt % solution in n-hexane.

Catalyst was mixed in line with MMAO 3A (modified methyl alumoxane) as received from Akzo Nobel at 7.1 wt % Al. Additional dilution was performed by adding isopentane to the mixture before introducing it to the reactor. Catalyst and MMAO feedrates were adjusted to provide a final Al:Zr molar ratio between 330 and 340.

The reactor was 2.4 m in diameter and was operated with a bed height of 11.6 m and a superficial gas velocity of approximately 0.6 m/s. Total reactor pressure was 1960 kPa. ATMER-163, an antistatic agent marketed by ICI, was added as necessary to the reactor to control the buildup of electrostatic charge.

Examples with cycle gas flow around nozzle

The catalyst atomization devices used in all examples were located at the end of a 1/4" (0.635 cm) OD stainless steel tube, and they could be removed from the reactor during operation. This tube passes through a ¾-inch (1.9 cm) schedule-40 pipe. A stream of 1000 to 1180 kg/hr of ethylene monomer at a temperature between 85 and 95° C. was fed through the annular space between the ¼-inch tube and the ¾-inch pipe. This monomer stream is referred to as a nozzle cleaning gas. For Examples 1 through 5, the ¾-inch pipe was located in the center of a six-inch pipe (15.2 cm), through which was fed between 22,700 and 29,500 kg/hr of cycle gas, known as particle deflecting gas. The six-inch pipe extended 53 cm into the reactor, the ¾-inch pipe extended 61 cm into the reactor, and the spray nozzle extended 66 cm into the reactor, at a location 2.4 m above the distributor plate.

Example 1 (Comparative)

A Ziegler-Natta seed bed was charged to the reactor and it was dried to 45 ppm water. It was pressurized to 790 kPa of nitrogen and then 36 kg/hr of 10% TEAL (triethyl aluminum) in isopentane were fed to the reactor over two hours and allowed to circulate for 1 hour. The reactor was filled with 1650 kPa of ethylene and with a hexene:ethylene molar ratio of 0.033, and the temperature of the fluidized bed was adjusted to 76° C. Catalyst and MMAO were contacted with a static mixer near the injection point at the reactor so that their contact time before dilution with isopentane was approximately 30 seconds.

Catalyst and cocatalyst solution were fed to the reactor through an injection tube of 0.30-cm inside tip diameter with a stream of 54.5 kg/hr of nitrogen atomization gas.

The reaction initiated immediately after the catalyst solution reached the reactor. Over the next 3 hours it was observed that hollow and flaky particles were being formed in the reactor with this spraying configuration. These particles were approximately 0.3 to 0.6 cm. During the first three hours of operation these particles grew in number so that they reached one weight percent of all the resin in the reactor. Previous experience had shown that the larger hollow and flaky particles could be expected to continue to grow in size and number until they caused operational difficulties. The APS decreased slightly from 0.704 to 0.648 mm over this period, indicative of the ability of the nozzle to form a large fraction of new particles. It would be expected, however, that the average particle size would eventually increase above an acceptable limit with continued formation of particles with flaky or hollow morphology.

Examples 2–5

Perpendicular Spray Nozzle

The perpendicular spray nozzle as described above as exemplary of a standard pneumatic nozzle was used for examples 2 through 5, in combination with the high flow of recycle gas past the spray nozzle. During those examples only a minimal amount of flaky or hollow particles were formed. The average particle sizes and bulk densities were good, and allowed continuous commercial operation for 10 days.

Examples 2 and 3

Control of APS with $N_2$ Carrier Rate

A seed bed was charged to the reactor and it was dried to 9 ppm water. It was pressurized to 790 kPa of nitrogen and then 22.7 kg/hr of 10 wt % TEAL in isopentane were fed to the reactor and allowed to circulate for 1 hour. The conditions listed in Table 2 below were established in the reactor. Catalyst was fed through a perpendicular spray nozzle, located within the stream of 22,700 kg/hr of cycle gas, as described above. Catalyst and MMAO were mixed for 15 to 30 seconds. The reactor was started with a nitrogen carrier rate of 27.2 kg/hr. This caused the APS of the resin to drop rapidly from 0.66 to 0.356 cm, which was not acceptable for good operation. The nitrogen carrier rate was then decreased to 14.3 lbs/hr and the APS increased to 0.533 cm, where it remained stable, and desirable. This shows that by proper control of the nitrogen carrier rate, the APS can be controlled. In other cases, if the APS is too large, the nitrogen carrier rate can be increased to lower the APS back to an acceptable range.

Examples 4 and 5

Control of APS with Isopentane Flow

These examples show that the APS can also be controlled by adjusting the amount of isopentane diluent added to the catalyst and cocatalyst mixture. The reactor was operating with the perpendicular spray nozzle and with the 1.33 wt % catalyst in the mixed hexane/hexene solvent, which was mixed with the MMAO for 19 minutes before being diluted with isopentane and fed to the reactor. Several hundred pounds per hour of isopentane were additionally fed to the reactor at a separate location to induce condensing mode operation. The amount of isopentane in the cycle gas was thereby increased to about 5 mole percent. The reactor was operated with the conditions listed in Example 4, and the APS was stable at 0.483 mm. The isopentane catalyst diluent feedrate then was decreased for Example 5, as shown in Table 2, and the APS increased to 0.610 mm, demonstrating that the APS can be controlled while in condensing mode, and that it can be controlled with the amount of isopentane diluent added to the catalyst mixture. It was demonstrated throughout the course of the 10 day run with the perpendicular spray nozzle that the APS could be kept in a narrow range by adjusting the nitrogen and isopentane carrier rates independently, or in concert.

TABLE 2

| Example | 1 | 2 | 3 | 4 | 5 |
| --- | --- | --- | --- | --- | --- |
| Atomization Device | Injection tube | Perp. spray nozzle | Perp. spray nozzle | Perp. spray nozzle | Perp. spray nozzle |
| Catalyst feedrate (kg/hr) | 0.66 | 0.34 | 0.77 | 0.64 | 0.64 |
| MMAO feedrate (kg/hr) | 3.3 | 1.7 | 3.8 | 2.0 | 2.0 |
| isopentane feedrate (kg/hr) | 5.9 | 6.8 | 4.7 | 6.6 | 4.2 |
| Nitrogen feedrate (kg/hr) | 54.5 | 27.2 | 14.3 | 13.6 | 13.6 |
| Reactor temperature (° C.) | 76 | 76 | 76 | 76 | 76 |
| Ethylene partial pressure (kPa) | 1585 | 1310 | 1310 | 1530 | 1530 |
| Molar C6/C2 ratio | 0.033 | 0.0255 | 0.0258 | 0.0246 | 0.0235 |
| Resin density (g/cm$^3$) | 0.91 | 0.917 | 0.918 | 0.918 | 0.918 |
| Average particle size (mm) | | | | | |
| Initial | 0.704 | 0.660 | 0.356 | 0.457 | 0.483 |
| Final | 0.648 | 0.356 | 0.533 | 0.483 | 0.610 |
| Bulk density (kg/m$^3$) | 359 | 378 | 362 | 366 | 348 |
| Morphology | Clusters of small spheres 1 wt % flakes and hollow particles of 3 to 6 mm | Spheres and small clusters | Spheres and small clusters | Spheres and small clusters | Spheres and small clusters |

Examples 6–7

Polymerization with Ethylene Carrier Gas Around Nozzle

During these examples, the catalyst was fed without the aid of the 22,700 kg/hr flow of cycle gas around the nozzle as in the previous examples. A heated ethylene flow of 1000 kg/hr was directed through a pipe around the nozzle (the nozzle cleaning gas). The pipe OD was 4.9 cm and the ID was 2.15 cm. It extended 58 cm into the reactor at a height of 2.4 m above the distributor plate. The catalyst atomization device was inserted 64 cm into the reactor.

The following examples demonstrate that when the reactor was operated with the perpendicular spray nozzle, the APS was stable. When the reactor was switched to an injection tube, the APS started to get too large. This does not mean that the injection tube cannot be made to work, under some conditions it has been successfully used, rather, it shows that the perpendicular spray nozzle was an improvement.

The reactor was charged with a seed bed of granular ethylene prepared from a Ziegler-Natta catalyst, and was heated and purged with pure nitrogen until the residual water level dropped to 20 ppm. While the reactor was pressurized with nitrogen, a stream of 36 kg/hr of 10 wt % TEAL was added to the recycle line for two hours. The TEAL was circulated through the reactor for an hour and then the reactor was pressurized further with monomer and comonomer, as shown below for Example 6. The catalyst and MMAO were mixed for approximately 10 to 30 seconds before being diluted with isopentane and fed to the reactor.

After one day of operation the perpendicular spray nozzle was positioned in the jet of ethylene described above. The nitrogen carrier rate was 27.2 kg/hr and the isopentane diluent was set at 3.6 kg/hr. The reactor was operated in this configuration for 16 hours and the particle size was stable, with a slight drift upward from 0.635 to 0.686 mm.

Next, the reactor was then run by spraying catalyst with an injection tube, which had a tip ID of 0.30 cm. The nitrogen carrier rate was 54.5 kg/hr and the total liquid rate was 14.4 kg/hr. After a nine hours of operation, the average particle size started an abrupt increase, eventually reaching 0.889 mm, demonstrating that under these conditions, the perpendicular spray nozzle was better at allowing control of particle size.

TABLE 3

| Example | 6 | 7 |
|---|---|---|
| Atomization Device | Perp. spray nozzle | Injection tube |
| Catalyst feedrate (kg/hr) | 1.1 | 1.4 |
| MMAO feedrate (kg/hr) | 5.6 | 7.1 |
| isopentane feedrate (kg/hr) | 3.6 | 5.9 |
| Nitrogen feedrate (kg/hr) | 27.2 | 54.5 |
| Reactor temperature (° C.) | 76 | 76 |
| Ethylene partial pressure (kPa) | 1516 | 1723 |
| Molar C6/C2 ratio | 0.025 | 0.028 |
| Resin density (g/cm$^3$) | 0.924 | 0.924 |
| Average particle size (mm) | | |
| Initial | 0.635 | 0.686 |
| Final | 0.686 | 0.889 |
| Bulk density (kg/m$^3$) | 388 | 356 |
| Morphology | Small clusters of spheres | Larger clusters |

We claim:

1. A method of delivering liquid catalyst to a gas phase polymerization reactor comprising feeding a catalytically effective amount of a liquid catalyst to a gas phase polymerization reactor with a perpendicular spray nozzle.

2. A method according to claim 1 wherein the perpendicular spray nozzle has a gas feed stream and a liquid catalyst feed stream.

3. A method according to claim 2 wherein the flow rates of the liquid and gas streams are determined based on polymerization reactor conditions.

4. A method according to claim 2 wherein the liquid catalyst feed stream additionally contains a liquid other than a catalyst.

5. A method according to claim 2 wherein the gas is selected from the group consisting of $N_2$, Ar, He, $CH_4$, $C_2H_6$, $C_3H_8$, $CO_2$ and $H_2$.

6. A process according to claim 1 wherein a particle deflecting gas allows the catalyst to enter the reactor in a particle-lean zone.

7. A method according to claim 3 wherein the liquid catalyst is fed through multiple perpendicular nozzles, each nozzle controlled to deliver different catalyst drop sizes.

8. A method according to claim 2 wherein the gas phase polymerization reactor has a recycle line and operates in condensing mode.

9. A method according to claim 2 wherein the liquid catalyst is selected from a slurry of supported catalyst, or a slurry of prepolymerized catalyst.

10. A method according to claim 1 additionally comprising feeding a cocatalyst to the reactor other than through the perpendicular spray nozzle.

11. A method for delivering a liquid catalyst to a gas phase polymerization reactor comprising delivering a liquid catalyst feed stream with a perpendicular spray nozzle to the reactor with a carrier gas at a weight ratio of gas to liquid in the liquid catalyst feed stream of about 0.5:1 to about 3.0:1.

12. A method according to claim 11 wherein the flow rates of the liquid and gas streams are determined based on polymerization reactor conditions.

13. A method according to claim 12 wherein the perpendicular spray nozzle has an orifice which may be automatically dilated.

14. A process according to claim 12 wherein the gas stream comprises a particle deflecting gas and the liquid catalyst is fed to the reactor in a particle-lean zone.

15. A method according to claim 12 wherein the liquid catalyst is fed through multiple perpendicular nozzles, each nozzle controlled to deliver different catalyst drop sizes.

16. A method according to claim 12 wherein the gas phase polymerization reactor has a recycle line and operates in condensing mode.

17. A method according to claim 12 wherein the liquid catalyst is selected from a slurry of supported catalyst, or a slurry of prepolymerized catalyst.

18. A method according to claim 12 additionally comprising feeding a cocatalyst to the reactor other than through the perpendicular spray nozzle.

19. A method according to claim 12 wherein the gas is selected from the group consisting of $N_2$, Ar, He, $CH_4$, $C_2H_6$, $C_3H_8$, $CO_2$ and $H_2$.

* * * * *